United States Patent
Lee et al.

(10) Patent No.: US 12,451,997 B2
(45) Date of Patent: Oct. 21, 2025

(54) METHOD AND APPARATUS FOR HARQ-ACK TRANSMISSION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 17/974,291

(22) Filed: Oct. 26, 2022

(65) Prior Publication Data

US 2023/0224086 A1    Jul. 13, 2023

(30) Foreign Application Priority Data

Jan. 11, 2022   (KR) .................. 10-2022-0004313

(51) Int. Cl.
*H04L 1/1812*    (2023.01)

(52) U.S. Cl.
CPC .................................. *H04L 1/1812* (2013.01)

(58) Field of Classification Search
CPC ............ H04L 1/1812; H04L 1/1854; H04L 2001/0093; H04L 1/1861; H04L 1/1848; H04L 1/1864
USPC ....................................... 370/310, 328, 329
See application file for complete search history.

(56) References Cited

U.S. PATENT DOCUMENTS

| | | | | |
|---|---|---|---|---|
| 2021/0226737 A1* | 7/2021 | Huang | ............ | H04W 52/0229 |
| 2022/0183032 A1* | 6/2022 | Papasakellariou | .... | H04L 1/1861 |
| 2022/0322292 A1* | 10/2022 | Takeda | .................. | H04W 72/20 |
| 2022/0377771 A1* | 11/2022 | Park | ...................... | H04L 1/1671 |
| 2023/0422275 A1* | 12/2023 | Kim | ...................... | H04L 5/0055 |

OTHER PUBLICATIONS

Samsung "On mechanisms to improve reliability for RRC_Connected UEs," 3GPP TSG RAN WG1 #106bis-e, R1-2109516, Oct. 2021, 7 pages.
Moderator (Huawei) "FL summar#6 on improving reliability for MBS for RRC_Connected UEs, " 3GPP TSG RAN WG1 #106bis-e, R1-2110646, Oct. 2021, 72 pages.

* cited by examiner

*Primary Examiner* — Obaidul Huq
(74) *Attorney, Agent, or Firm* — BRYAN CAVE LEIGHTON PAISNER LLP

(57) ABSTRACT

A method and an apparatus for transmitting or receiving hybrid automatic repeat request-acknowledgment (HARQ-ACK) information in a wireless communication system are disclosed. A method of transmitting hybrid automatic repeat request-acknowledgment (HARQ-ACK) information by a terminal in a wireless communication system according to an embodiment of the present disclosure may comprise: receiving, from a network, a first physical downlink shared channel (PDSCH) based on a first HARQ-ACK reporting mode; receiving, from the network, a second PDSCH based on a second HARQ-ACK reporting mode; and transmitting, to the network, the HARQ-ACK information based on a sequence in which a first bit corresponds to the first HARQ-ACK reporting mode and a second bit corresponds to the second HARQ-ACK reporting mode.

5 Claims, 12 Drawing Sheets

METHOD AND APPARATUS FOR HARQ-ACK TRANSMISSION IN WIRELESS COMMUNICATION SYSTEM

CROSS-REFERENCE RELATED APPLICATIONS

This application claims the benefit of earlier filing date and right of priority to Korean Application No. 10-2022-0004313, filed on Jan. 11, 2022, the contents of which are all hereby incorporated by reference herein in their entirety.

TECHNICAL FIELD

The present disclosure relates to a wireless communication system, and more particularly, to a method and apparatus for transmitting or receiving hybrid automatic repeat request-acknowledgment (HARQ-ACK) information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for multiplexing and transmitting or receiving HARQ-ACK information of various reporting modes in a wireless communication system.

An additional technical object of the present disclosure is to provide a method and an apparatus for multiplexing and transmitting or receiving NACK only-based HARQ-ACK information, ACK/NACK-based HARQ-ACK information, and/or scheduling request (SR), or the like in a wireless communication system.

The technical objects to be achieved by the present disclosure are not limited to the above-described technical objects, and other technical objects which are not described herein will be clearly understood by those skilled in the pertinent art from the following description.

According to an aspect of the present disclosure, a method of transmitting hybrid automatic repeat request-acknowledgment (HARQ-ACK) information by a terminal in a wireless communication system may comprise: receiving, from a network, a first physical downlink shared channel (PDSCH) based on a first HARQ-ACK reporting mode; receiving, from the network, a second PDSCH based on a second HARQ-ACK reporting mode; and transmitting, to the network, the HARQ-ACK information based on a sequence in which a first bit corresponds to the first HARQ-ACK reporting mode and a second bit corresponds to the second HARQ-ACK reporting mode.

According to another aspect of the present disclosure, a method of receiving hybrid automatic repeat request-acknowledgment (HARQ-ACK) information by a base station in a wireless communication system may comprise: transmitting, to a terminal, a first physical downlink shared channel (PDSCH) based on a first HARQ-ACK reporting mode; transmitting, to the terminal, a second PDSCH based on a second HARQ-ACK reporting mode; and receiving, from the terminal, the HARQ-ACK information based on a sequence in which a first bit corresponds to the first HARQ-ACK reporting mode and a second bit corresponds to the second HARQ-ACK reporting mode.

According to the present disclosure, a method and an apparatus for multiplexing and transmitting or receiving HARQ-ACK information of various reporting modes in a wireless communication system may be provided.

According to the present disclosure, a method and an apparatus for multiplexing and transmitting or receiving NACK only-based HARQ-ACK information, ACK/NACK-based HARQ-ACK information, and/or scheduling request (SR), or the like in a wireless communication system may be provided.

Effects achievable by the present disclosure are not limited to the above-described effects, and other effects which are not described herein may be clearly understood by those skilled in the pertinent art from the following description.

BRIEF DESCRIPTION OF DRAWINGS

Accompanying drawings included as part of detailed description for understanding the present disclosure provide embodiments of the present disclosure and describe technical features of the present disclosure with detailed description.

DETAILED DESCRIPTION

Figure 1:
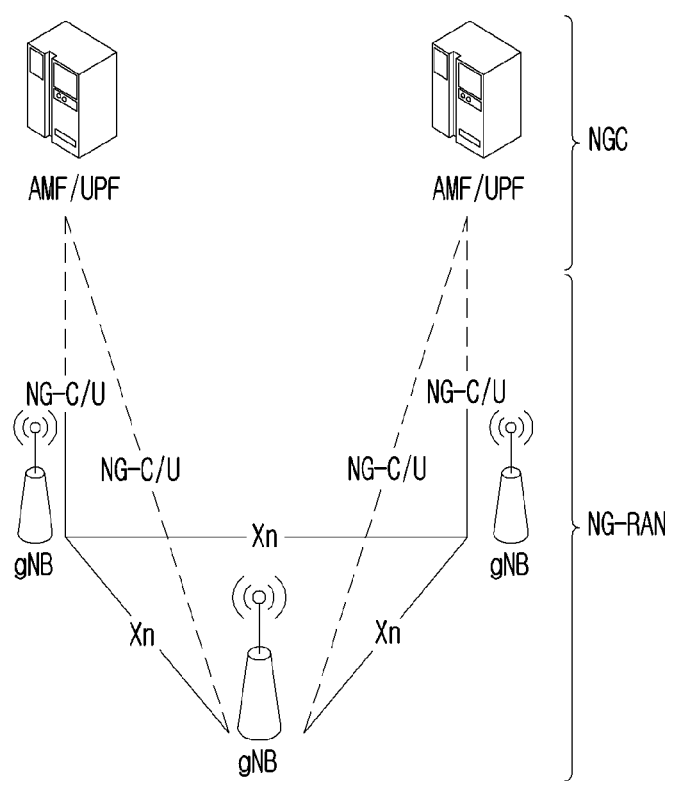
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI channel state information—reference signal resource indicator
CSI channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
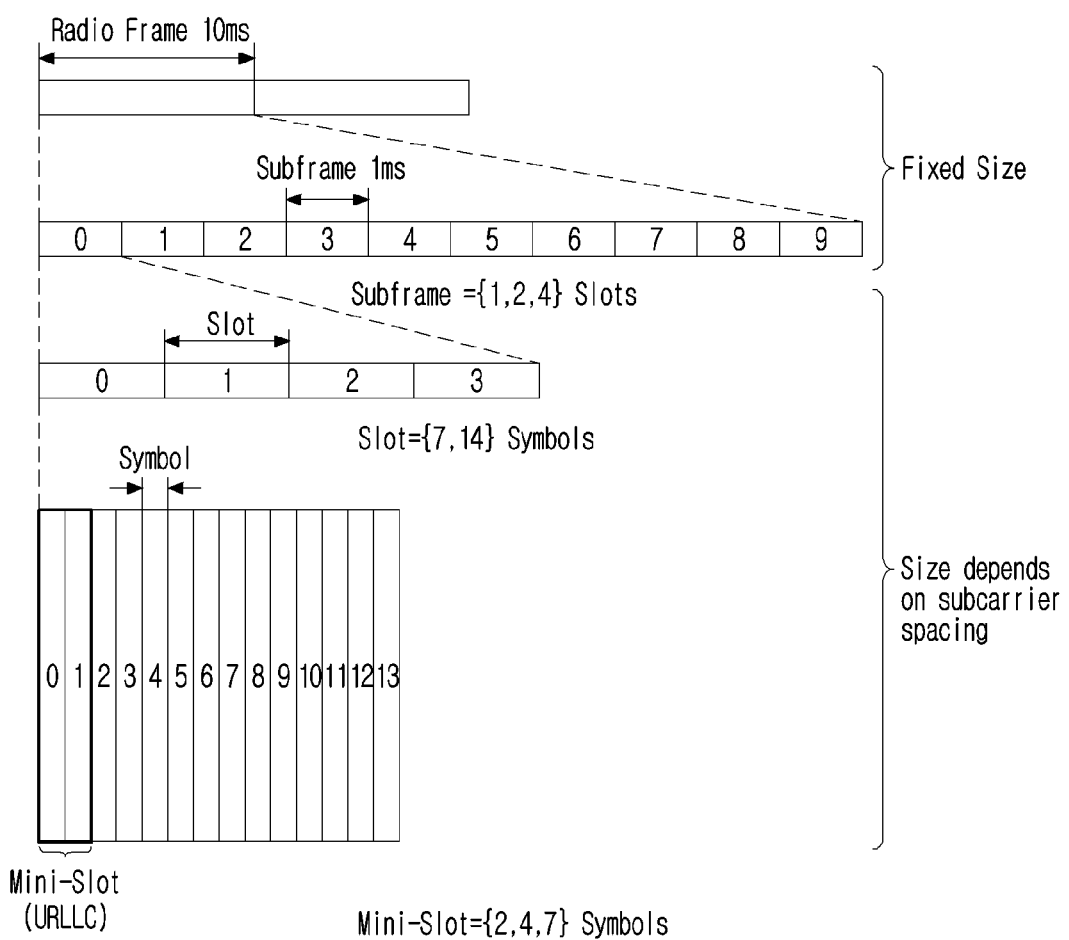
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
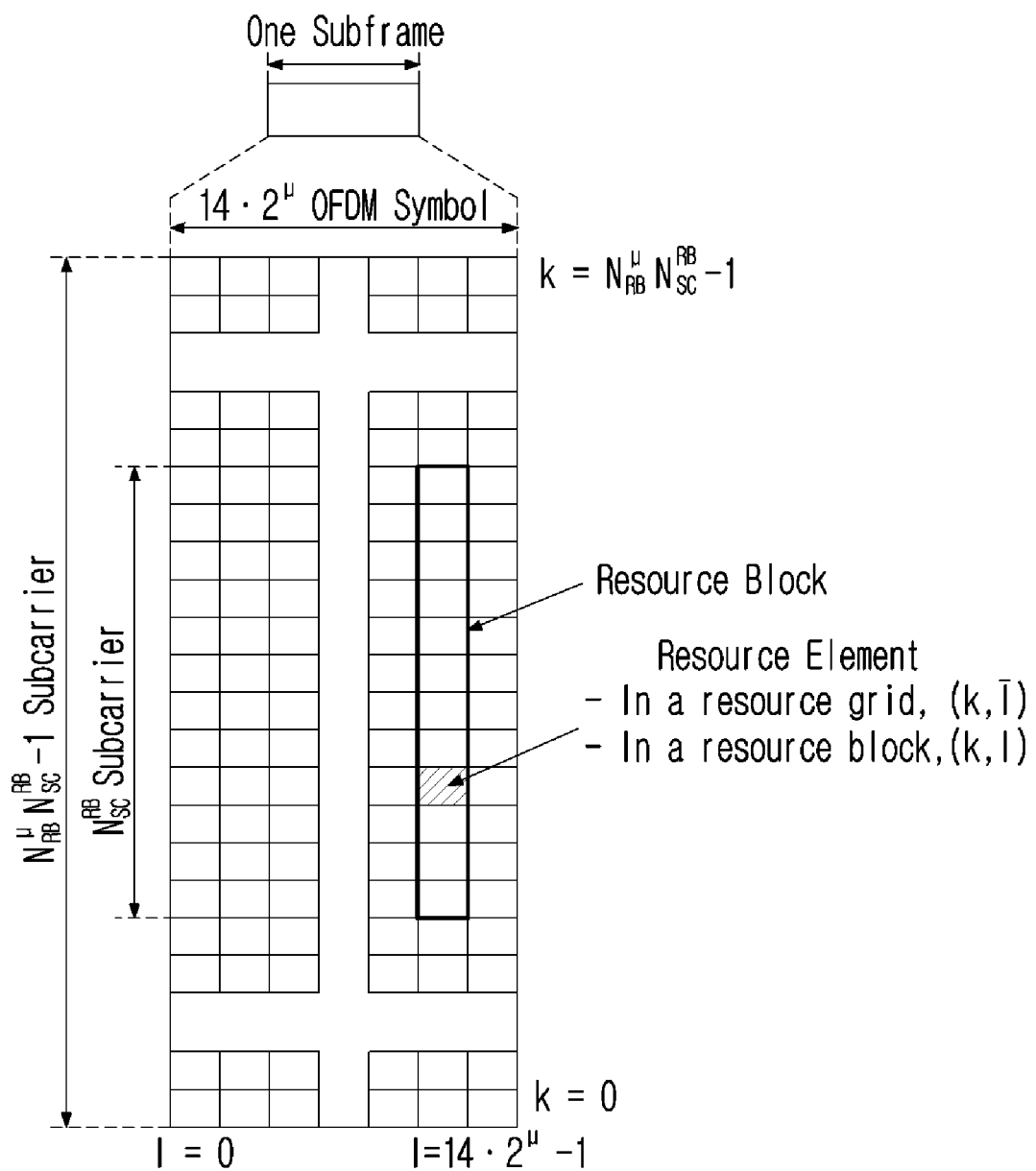
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \quad [\text{Equation 2}]$$

$N_{BWP,i}^{start,\mu}$ is a common resource block that a BWP starts relatively to common resource block 0.

Figure 4:
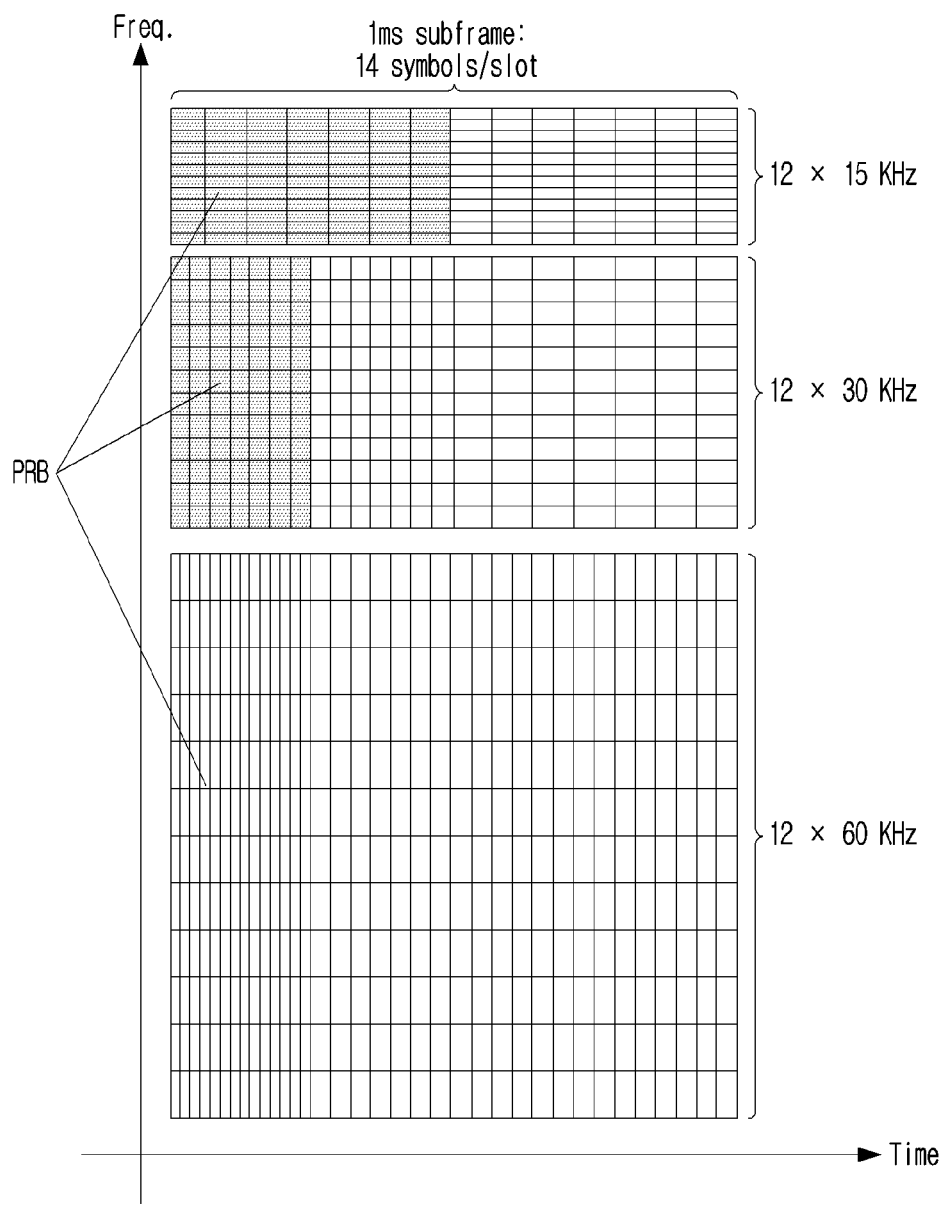
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
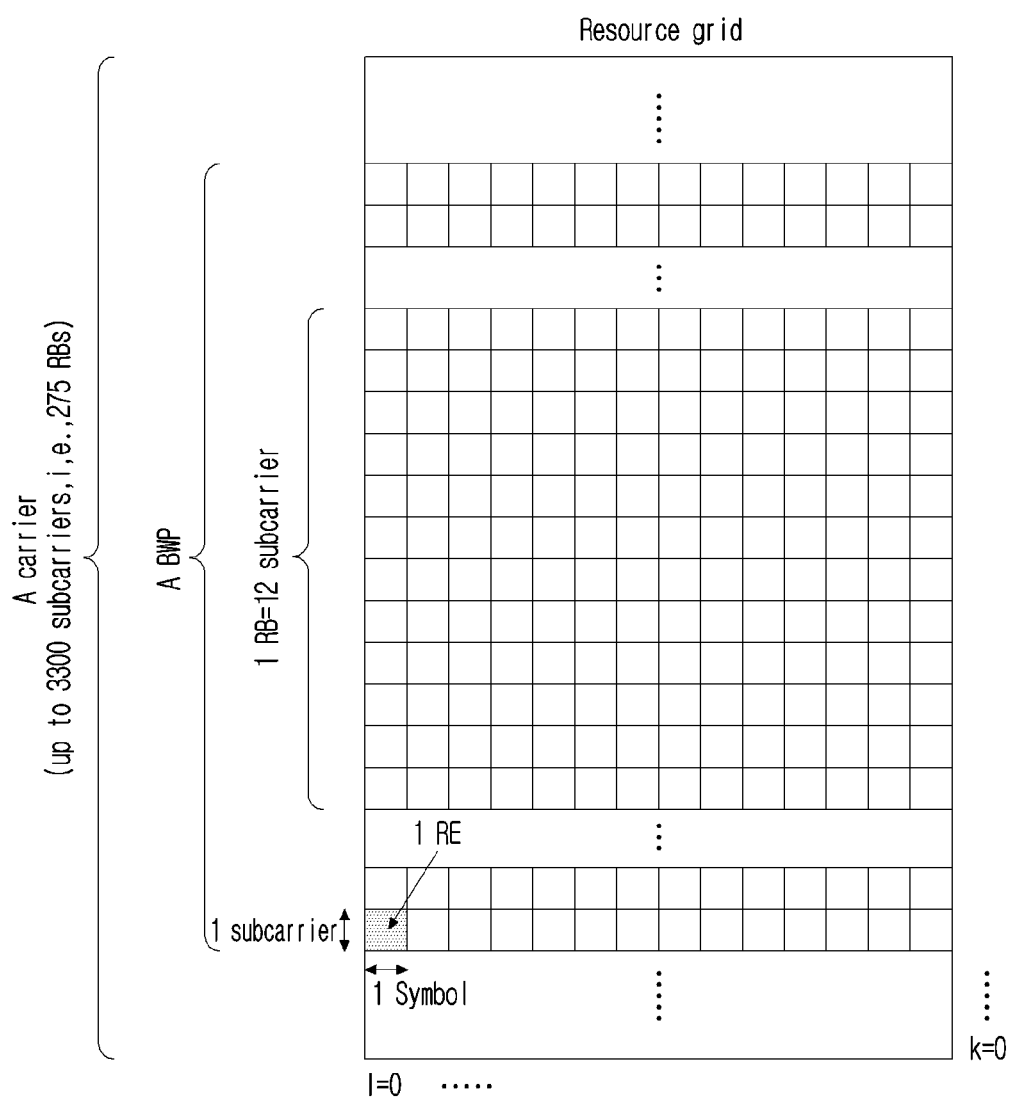
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
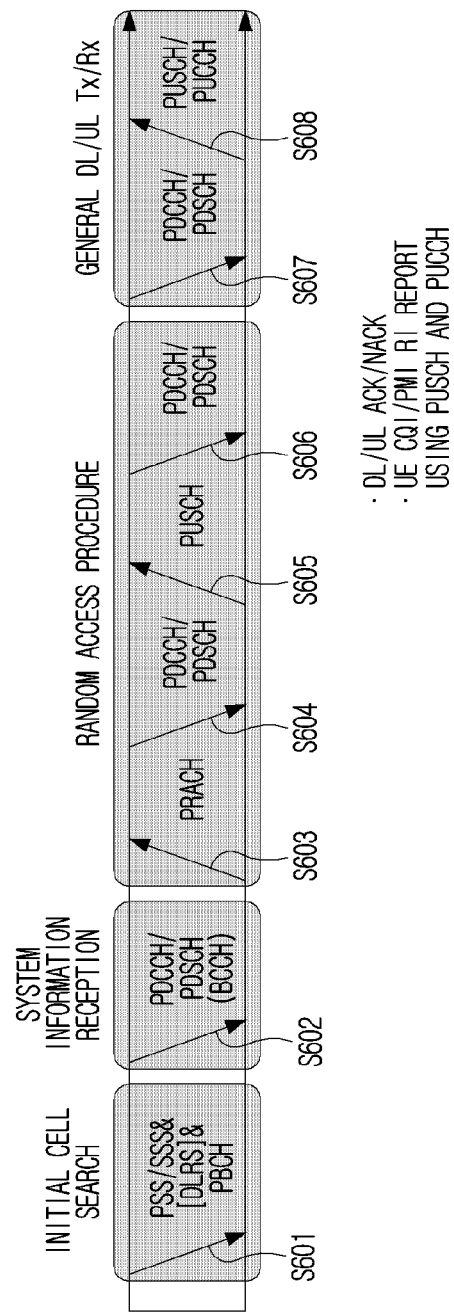
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgment/Non-Acknowledgment) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast Multicast Service)

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

SFN scheme may be used to provide a broadcast service to a wide area (e.g., MBMS area) through resources allocated semi-statically in advance. A multicast broadcast single frequency network (MBSFN) provides logical channels, a multicast control channel (MCCH) and a multicast traffic channel (MTCH), and both of the MCCH and the MTCH are mapped to a transport channel, a multicast channel (MCH), and the MCH is mapped to a physical channel, a physical multicast channel (PMCH). That is, a plurality of base stations/cells may be synchronized to provide the same data to a terminal through the PMCH. One base station/cell may belong to a plurality of MBSFN areas. In addition, it may be required to configure the MBSFN subframe for the MBSFN service.

SC-PTM scheme may be mainly used to provide a broadcast service only within a cell coverage through dynamic resources. SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting data corresponding to the SC-MCCH or SC-MTCH is scheduled through a PDCCH that is CRC scrambled with a group-radio network temporary identifier (G-RNTI). Here, a temporary mobile group identity (TMGI) corresponding to the MBMS service ID may be mapped one-to-one with a specific G-RNTI value. Accordingly, if the base station provides a plurality of MBMS services, a plurality of G-RNTI values may be allocated for SC-PTM transmission. One or more terminals may perform PDCCH monitoring using a specific G-RNTI to receive a specific MBMS service. Here, a discontinuous reception (DRX) on-duration period dedicated to SC-PTM may be configured for a specific MBMS service/specific G-RNTI. In this case, the corresponding terminals may wake up only for a specific on-duration period and perform PDCCH monitoring for the G-RNTI.

SPS (Semi-Persistent Scheduling)

The base station may provide a specific terminal with SPS configuration dedicated to the terminal, and allocate one or more downlink SPS transmission resources that are repeated according to a configured period. DCI of terminal-dedicated (or terminal-specific) PDCCH may indicate activation (SPS activation) of a specific SPS configuration index. The terminal may perform downlink reception through the activated SPS transmission resource. Such SPS transmission resource may be used for initial HARQ transmission. The base station may allocate a retransmission resource of a specific SPS configuration index through DCI of PDCCH dedicated to a terminal. For example, when the terminal reports HARQ NACK for the SPS transmission resource, the base station may allocate the retransmission resource through DCI so that the terminal may receive downlink retransmission.

DCI of PDCCH dedicated to a terminal may indicate release or deactivation of a specific SPS configuration index. In this case, the corresponding terminal does not receive the SPS transmission resource for which release/deactivation is indicated.

CRC of DCI/PDCCH for activation/retransmission/deactivation for SPS configuration/resource may be scrambled by configured scheduling-radio network temporary identifier (CS-RNTI).

MBS (Multicast Broadcast Service)

In the NR-based wireless communication system, introduction of a new MBS-based DL broadcast or DL multicast transmission scheme, which is distinct from the aforementioned MBMS (e.g., MBSFN or SC-PTM), is being discussed. For example, the network side (e.g., base station/cell/TRP) may provide a point-to-multipoint (PTM) transmission scheme and a point-to-point (PTP) transmission scheme for DL broadcast or DL multicast transmission.

In the PTM transmission scheme for MBS, the base station may transmit a group common (or group-specific) PDCCH and a group common PDSCH to a plurality of terminals. A plurality of terminals may simultaneously receive the same group common PDCCH transmission and group common PDSCH transmission, and decode the same MBS data.

In the PTP transmission scheme for MBS, the base station may transmit a terminal-dedicated (or terminal-specific) PDCCH and a terminal-dedicated PDSCH to a specific terminal. The corresponding single terminal may receive the terminal-dedicated PDCCH and a terminal-dedicated PDSCH. When there are a plurality of terminals receiving the same MBS service, the base station may individually transmit the same MBS data to each of the plurality of terminals through different terminal-dedicated PDCCHs and terminal-dedicated PDSCHs.

In the PTM transmission scheme, the base station may transmit a plurality of group common PDSCHs to the terminals. The base station may receive from the terminal HARQ-ACK for the group common PDSCH through the terminal-dedicated PUCCH resource.

When a transport block (TB) for a group common PDSCH is successfully decoded in a terminal, the terminal may transmit an ACK value as HARQ-ACK information. When the terminal does not successfully decode the TB for a unicast PDSCH or a group common PDSCH, the terminal may transmit a NACK value as HARQ-ACK information. Such HARQ-ACK transmission scheme may be referred to as an ACK/NACK-based HARQ-ACK scheme. In general, ACK/NACK-based HARQ-ACK information may be transmitted through a terminal-dedicated PUCCH resource.

For a group common PDSCH, NACK only-based HARQ-ACK scheme may be applied/configured. For example, a terminal may not transmit PUCCH in a case of an ACK value (i.e., when decoding of the received PDSCH succeeds), and transmit PUCCH only in the case of a NACK value (i.e., when decoding of the received PDSCH fails). In general, NACK only-based HARQ-ACK information may be transmitted through a group common PUCCH resource. When a plurality of HARQ-ACKs are transmitted in the NACK only-based HARQ-ACK scheme, HARQ-ACK information including only ACK values is not transmitted, and HARQ-ACK information including at least one NACK value may be transmitted.

In the following examples, ACK/NACK-based HARQ-ACK may be referred to as HARQ-ACK information based on the first HARQ-ACK reporting mode, and NACK only-based HARQ-ACK may be referred to as HARQ-ACK information based on the second HARQ-ACK reporting mode. In addition, the DCI format CRC scrambled by the G-RNTI or G-CS-RNTI may be referred to as a group common DCI format or a multicast DCI format. The group common/multicast DCI format may also be referred to as a group common/multicast PDCCH, and a PDSCH scheduled thereby may be referred to as a group common/multicast PDSCH.

In the present disclosure, the ACK/NACK-based HARQ-ACK transmission scheme is not limited to HARQ-ACK for unicast PDCCH/PDSCH, and as described above, ACK/NACK-based HARQ-ACK transmission scheme may also be applied to HARQ-ACK for multicast PDCCH/PDSCH.

HARQ-ACK according to such various reporting modes, or a plurality of HARQ-ACK information of the same reporting mode, and/or a multiplexing scheme of a scheduling request (SR) has not yet been clearly defined.

In the present disclosure, a method of multiplexing NACK only-based HARQ-ACK with ACK/NACK-based HARQ-ACK and/or SR, and a method of transmitting multiplexed uplink control information (UCI) will be described. For example, UCI may include SR, HARQ-ACK, channel state information (CSI), or the like.

Figure 7:
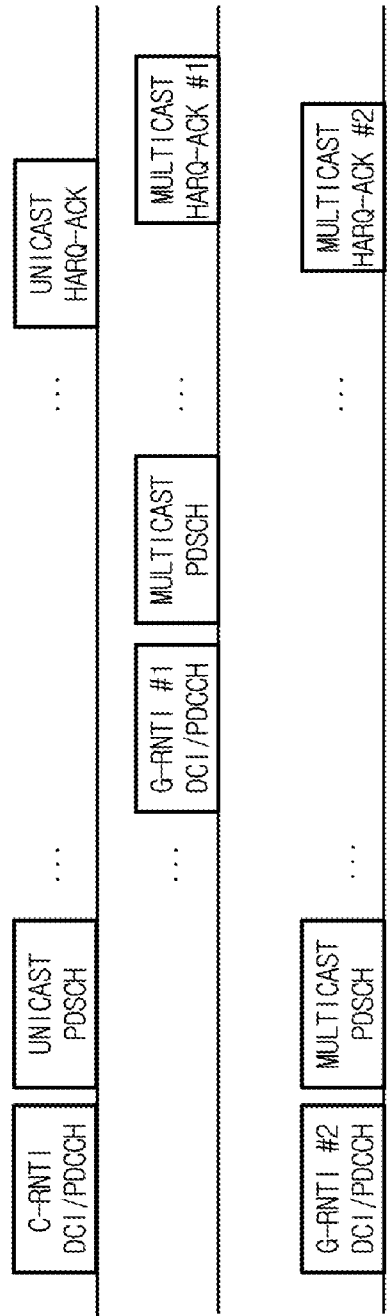
FIG. 7 exemplarily depicts the overlapping situation of HARQ-ACK of various reporting schemes to which the present disclosure may be applied.

FIG. 7 exemplarily depicts the overlapping situation of HARQ-ACK of various reporting schemes to which the present disclosure may be applied.

In the example of FIG. 7, DCI (or PDCCH), PDSCH scheduled thereby, and HARQ-ACK therefor were depicted on the same line. That is, in FIG. 7, three sets of associated/corresponding DCI (PDCCH), PDSCH, and HARQ-ACK are depicted. Although the horizontal axis is related to time, it is not intended to represent an absolute or relative time position.

In the example of FIG. 7, unicast DCI may be CRC scrambled with C-RNTI, and multicast DCI may be CRC scrambled with G-RNTI. Unicast DCI and/or multicast DCI may indicate high priority (HP) or low priority (LP). In addition, HARQ-ACK for unicast DCI/PDSCH may be ACK/NACK-based HARQ-ACK, and HARQ-ACK for multicast DCI/PDSCH may be ACK/NACK-based HARQ-ACK or NACK only-based HARQ-ACK.

For example, unicast PDCCH/PDSCH and multicast PDCCH/PDSCH, or multicast PDCCH/PDSCH and multicast PDCCH/PDSCH scheduled in different G-RNTIs may be received in FDM or TDM. For example, the unicast PDSCH occasion may be transmitted in TDM with the multicast PDSCH occasion for G-RNTI #1, and may be transmitted in FDM with the multicast PDSCH occasion for G-RNTI #2.

In addition, the base station may configure a common frequency resource (CFR) for PTM transmission to the terminal. For example, the CFR may be referred to as a common and identical frequency resource allocated to a plurality of terminals, or may be referred to as a frequency resource commonly used to provide various MBS. In addition, the CFR may be distinguished from the existing terminal-dedicated (or terminal-specific) BWP, and may be referred to as a BWP for MBS. CFR may be associated with the terminal-dedicated BWP.

The base station may configure, separately from PDSCH configuration related information (e.g., PDSCH-config) for BWP, PDSCH-config for CFR. CFR may be associated with the active BWP of the terminal. Accordingly, some parameters may be configured in common for CFR and BWP. Therefore, the base station may configure some parameters in only one PDSCH-config without repeating in the PDSCH-config for CFR and PDSCH-config for BWP. For example, if the configuration value for parameter A is the same in PDSCH-config for CFR and PDSCH-config for BWP, the base station may include parameter A only in PDSCH-config for BWP (or only in PDSCH-config for CFR).

In the PUCCH transmission of the present disclosure, it may be configured to transmit a plurality of PUCCHs for a plurality of transmission configuration indicator (TCI) states according to a multiple-transmission/reception point (MTRP) configuration. In this case, the terminal may determine the TCI state for multicast HARQ-ACK transmission as follows. For example, the terminal may transmit the multicast HARQ-ACK only for PUCCH transmission having the same TCI state as the multicast PDSCH among the two PUCCH transmissions, and not include the multicast HARQ-ACK in another PUCCH transmission. As an additional example, the terminal may repeatedly include multicast HARQ-ACK in two PUCCH transmissions.

In this disclosure, various methods for multiplexing for ACK/NACK-based HARQ-ACK information, NACK only-based HARQ-ACK information, and/or scheduling request (SR) will be described. For example, when transmissions of HARQ-ACK information according to various reporting modes overlap or need to be transmitted in the same slot, according to one of the examples described below or according to a combination of two or more examples, (a plurality of) HARQ-ACK (and/or SR) may be multiplexed into one PUCCH and transmitted or received.

Figure 8:
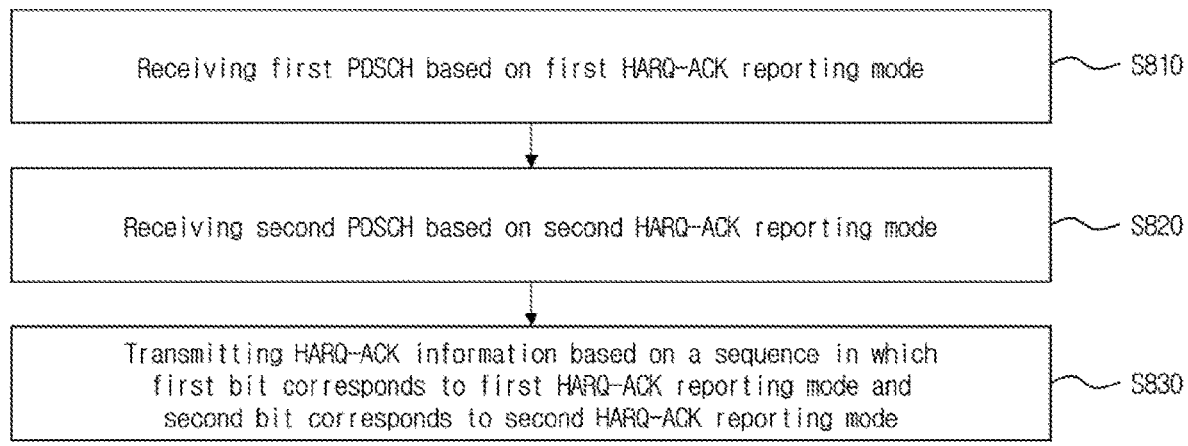
FIG. 8 is a diagram for illustrating a HARQ-ACK transmission method of a terminal according to an embodiment of the present disclosure.

FIG. 8 is a diagram for illustrating a HARQ-ACK transmission method of a terminal according to an embodiment of the present disclosure.

In step S810, the terminal may receive the first PDSCH based on the first HARQ-ACK reporting mode from the network.

In step S820, the terminal may receive the second PDSCH based on the second HARQ-ACK reporting mode from the network.

The first HARQ-ACK reporting mode may correspond to the ACK/NACK reporting mode. That is, the first HARQ-ACK reporting mode may correspond to a mode in which an ACK value or a NACK value is reported based on whether the transport block of the first PDSCH is successfully decoded. In addition, the first PDSCH may correspond to unicast or multicast. That is, the first HARQ-ACK report mode may be applied to both unicast PDCCH/PDSCH and multicast PDCCH/PDSCH.

The second HARQ-ACK reporting mode may correspond to the NACK only reporting mode. That is, the second HARQ-ACK reporting mode may correspond to a mode in which HARQ-ACK information including only ACK values is not reported and HARQ-ACK information including a NACK value is reported. For example, the second HARQ-ACK reporting mode may be applied to multicast PDCCH/PDSCH.

The first PDSCH and the second PDSCH of steps S810 and S820 may be received sequentially, or may be received in parallel (or simultaneously).

In step S830, the terminal may transmit HARQ-ACK information to the network based on a sequence in which the first bit corresponds to the first HARQ-ACK reporting mode and the second bit corresponds to the second HARQ-ACK reporting mode.

The sequence may be related to PUCCH. For example, the sequence may be constructed for PUCCH transmission.

The first bit and the second bit of the sequence may be associated with HARQ-ACK reporting types. For example, the first bit and the second bit of the sequence may be associated with HARQ-ACK reporting types, irrespective of the reception order of the first PDSCH and the second PDSCH (i.e., for any case that the first PDSCH is received later than the second PDSCH, or the second PDSCH is received later than the first PDSCH, or the first PDSCH and the second PDSCH are simultaneously received). For example, the first bit of the sequence may correspond to the first HARQ-ACK reporting mode, and the second bit of the sequence may correspond to the second HARQ-ACK reporting mode.

For example, the first bit may correspond to the most significant bit (MSB) of the sequence, and the second bit may correspond to the least significant bit (LSB) of the sequence.

The second bit corresponding to the second HARQ-ACK reporting mode (or NACK only reporting mode) may have an ACK value or a NACK value based on whether the transport block of the second PDSCH is successfully decoded. For example, the second bit of the sequence may be constructed by transforming the second HARQ-ACK reporting mode related (or configured) to the second PDSCH into the first HARQ-ACK reporting mode (or ACK/NACK reporting mode). That is, even though the second bit is configured to correspond to the second HARQ-ACK reporting mode, when multiplexed with the first bit for the first HARQ-ACK reporting mode, the second bit may have a value according to the first HARQ-ACK reporting mode.

When the HARQ-ACK for one or more PDSCHs in addition to the first and second PDSCHs are multiplexed as in step S830 and transmitted through one sequence, except for the two PDSCHs among them, HARQ-ACK for the remaining one or more PDSCHs may be dropped. HARQ-ACK for two non-dropped PDSCHs may correspond to the first bit and the second bit, respectively. The remaining one or more PDSCHs for which the HARQ-ACK is dropped may be configured as the second HARQ-ACK reporting mode. For example, among the PDSCHs configured in the NACK only reporting mode, HARQ-ACK may not be dropped for only one of them, and HARQ-ACK may be dropped for the rest.

Figure 9:
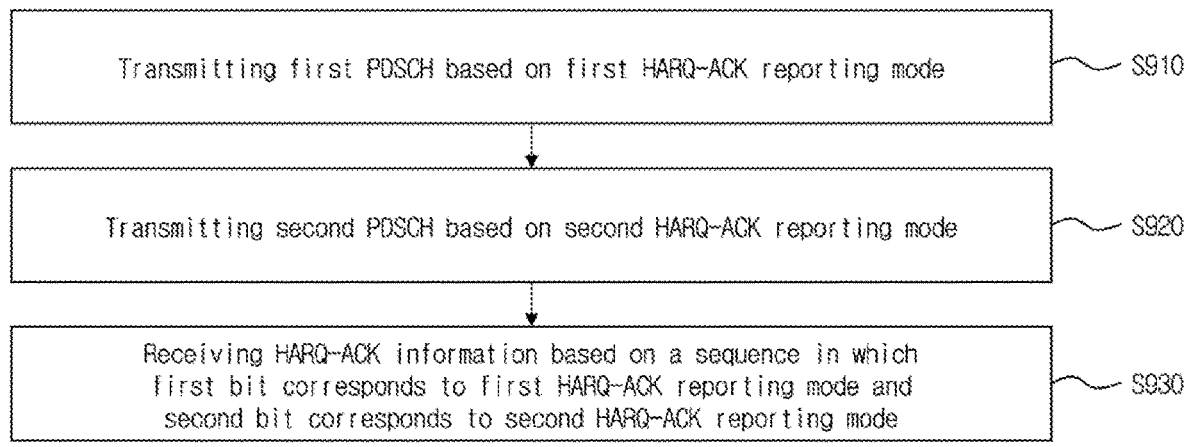
FIG. 9 is a diagram for illustrating a HARQ-ACK reception method of a base station according to an embodiment of the present disclosure.

FIG. 9 is a diagram for illustrating a HARQ-ACK reception method of a base station according to an embodiment of the present disclosure.

In step S910, the base station may transmit the first PDSCH based on the first HARQ-ACK reporting mode to the terminal.

In step S920, the base station may transmit the second PDSCH based on the second HARQ-ACK reporting mode to the terminal.

In step S930, the base station may receive HARQ-ACK information from the terminal based on a sequence in which the first bit corresponds to the first HARQ-ACK report mode and the second bit corresponds to the second HARQ-ACK report mode.

In the example of FIG. 9, the examples described in FIG. 8 may be equivalently applied to the HARQ-ACK reporting modes and the sequence for HARQ-ACK multiplexing, the redundant description will be omitted.

A method of multiplexing various HARQ-ACK information including the above-described, which may be applied to the examples of FIGS. 8 and 9, will be described hereinafter. For example, the present disclosure includes a multiplexing scheme of NACK only-based HARQ-ACK. For example, in the present disclosure, for the cases that other UCI multiplexed with NACK only-based HARQ-ACK is NACK only-based HARQ-ACK, ACK/NACK-based HARQ-ACK, and/or SR, specific examples of multiplexing and transmission/reception will be described.

Embodiment 1

The present embodiment relates to multiplexing of NACK-only based HARQ-ACK for multicast and SR.

For example, when a PUCCH transmission for NACK only-based feedback for multicast collides with PUCCH transmission(s) for SR for the same priority, one of the following examples may be applied.

Embodiment 1-1

Up to two TBs based on the NACK only reporting mode may be transformed into ACK/NACK HARQ bit(s). The transformed ACK/NACK bit(s) may be multiplexed with the SR according to an existing scheme.

In this case, PUCCH resources configured for unicast may be used.

When the number of TBs based on the NACK only reporting mode is more than two, SR may be dropped.

Embodiment 1-2

For a positive SR, the NACK only-based HARQ-ACK may be transmitted on the PUCCH resource configured for the SR. When the PUCCH resource configured for the SR is not sufficient to accommodate the multiplexed UCI (e.g., when a plurality of NACK only HARQ bits are multiplexed with the SR), the SR may be dropped.

For a negative SR, NACK only feedback may be transmitted on the PUCCH resource configured for NACK only HARQ-ACK.

Embodiment 1-3

For a positive SR, up to two TBs based on the NACK only reporting mode may be transformed into ACK/NACK HARQ bit(s). The transformed ACK/NACK bit(s) may be multiplexed with the SR according to an existing scheme.

For a negative SR, NACK only feedback may be transmitted on the PUCCH resource configured for NACK only HARQ-ACK.

Embodiment 1-4

For a positive SR, the NACK only based HARQ-ACK may be transmitted on the PUCCH resource configured for the SR. When the PUCCH resource configured for the SR is not sufficient to accommodate the multiplexed UCI (e.g., when a plurality of NACK only HARQ bits are multiplexed with the SR), the SR may be dropped.

For a negative SR, up to two TBs based on the NACK only reporting mode may be transformed into an ACK/NACK HARQ bit(s). The transformed ACK/NACK bit(s) may be multiplexed with the SR according to an existing scheme.

Embodiment 2

The present embodiment relates to multiplexing of NACK only-based HARQ-ACK for multicast and ACK/NACK-based HARQ-ACK.

For example, when PUCCH transmission for NACK only-based feedback for multicast collides with ACK/NACK feedback for unicast for the same priority, the terminal may multiplex NACK only-based feedback and ACK/NACK-based feedback for PUCCH format 0 or 1 based on one of the following examples.

In this case, multiplexed HARQ-ACK information may be transmitted on the PUCCH resource determined for ACK/NACK-based feedback.

In relation to the following examples, an example of a mapping relationship between two HARQ-ACK information bits and a PUCCH format sequence may be defined as shown in Table 6 below.

TABLE 6

| HARQ-ACK Value | {0, 0} | {0, 1} | {1, 1} | {1, 0} |
|---|---|---|---|---|
| Sequence cyclic shift | mCS = 0 | mCS = 3 | mCS = 6 | mCS = 9 |

Embodiment 2-1

It is assumed that one bit for unicast HARQ-ACK and one bit for multicast HARQ-ACK are multiplexed for PUCCH format 0 or 1.

In this case, the MSB of the HARQ-ACK value of Table 6 may correspond to unicast HARQ-ACK, and the LSB of the HARQ-ACK value of Table 6 may correspond to the multicast HARQ-ACK. Alternatively, the MSB of the HARQ-ACK value of Table 6 may correspond to multicast HARQ-ACK, and the LSB of the HARQ-ACK value of Table 6 may correspond to the unicast HARQ-ACK.

Embodiment 2-2

It is assumed that one or two bits for unicast HARQ-ACK and one or two bits for multicast HARQ-ACK are multiplexed for PUCCH format 0 or 1.

Embodiment 2-2-1

In the case of two bits for unicast HARQ-ACK, only one bit among them may be multiplexed with multicast HARQ-ACK and the other bit may be dropped. Alternatively, in the case of two bits for multicast HARQ-ACK, only one bit among them may be multiplexed with unicast HARQ-ACK and the other bit may be dropped.

In this case, the MSB of the HARQ-ACK value of Table 6 may correspond to unicast HARQ-ACK, and the LSB of the HARQ-ACK value of Table 6 may correspond to the multicast HARQ-ACK. Alternatively, the MSB of the HARQ-ACK value of Table 6 may correspond to multicast HARQ-ACK, and the LSB of the HARQ-ACK value of Table 6 may correspond to the unicast HARQ-ACK.

Embodiment 2-2-2

In the case of two bits for unicast HARQ-ACK, when at least one bit of them corresponds to NACK, the multiplexed bit for unicast HARQ-ACK may be set to NACK. In the case of two bits for unicast HARQ-ACK, when at least one bit among them corresponds to NACK, the multiplexed bit for multicast HARQ-ACK may be set to NACK.

When both bits for unicast HARQ-ACK correspond to ACK, the multiplexed bit for unicast HARQ-ACK may be set to ACK. When both bits for unicast HARQ-ACK correspond to ACK, a multiplexed bit for multicast HARQ-ACK may be set to ACK.

In the case of two bits for multicast HARQ-ACK, when at least one bit of them corresponds to NACK, the multiplexed bit for multicast HARQ-ACK may be set to NACK. In the case of two bits for multicast HARQ-ACK, when at least one bit among them corresponds to NACK, the multiplexed bit for unicast HARQ-ACK may be set to NACK.

When both bits for multicast HARQ-ACK correspond to ACK, the multiplexed bit for multicast HARQ-ACK may be set to ACK. When both bits for multicast HARQ-ACK correspond to ACK, a multiplexed bit for unicast HARQ-ACK may be set to ACK.

In this case, the MSB of the HARQ-ACK value of Table 6 may correspond to unicast HARQ-ACK, and the LSB of the HARQ-ACK value of Table 6 may correspond to the multicast HARQ-ACK. Alternatively, the MSB of the HARQ-ACK value of Table 6 may correspond to multicast HARQ-ACK, and the LSB of the HARQ-ACK value of Table 6 may correspond to the unicast HARQ-ACK.

Embodiment 2-2-3

It is assumed that the multicast HARQ-ACK bit is dropped and only the unicast HARQ-ACK bit is transmitted. In this case, both the MSB and the LSB of the HARQ-ACK value of Table 6 may correspond to the unicast HARQ-ACK.

Alternatively, it is assumed that the unicast HARQ-ACK bit is dropped and only the multicast HARQ-ACK bit is transmitted. In this case, both the MSB and the LSB of the HARQ-ACK value of Table 6 may correspond to the multicast HARQ-ACK.

Embodiment 2-2-4

In the case of two bits for NACK only-based HARQ-ACK, when at least one of them corresponds to NACK, the multiplexed bit for multicast HARQ-ACK may be set to NACK. The multiplexed bit for unicast HARQ-ACK may be set based on the above-described embodiment 2-2-1, embodiment 2-2-2, or embodiment 2-2-3.

In this case, the MSB of the HARQ-ACK value of Table 6 may correspond to unicast HARQ-ACK, and the LSB of the HARQ-ACK value of Table 6 may correspond to the multicast HARQ-ACK. Alternatively, the MSB of the HARQ-ACK value of Table 6 may correspond to multicast HARQ-ACK, and the LSB of the HARQ-ACK value of Table 6 may correspond to the unicast HARQ-ACK.

Embodiment 3

The present embodiment relates to multiplexing of NACK only based HARQ-ACK for multicast, ACK-NACK based HARQ-ACK, and SR.

For example, when a PUCCH transmission for NACK only based feedback for multicast collides with PUCCH transmissions for ACK/NACK based feedback for unicast for the same priority and SR for the same priority, the terminal may multiplex NACK only based feedback, ACK/NACK-based feedback, and SR for PUCCH format 0 or 1 based on one of the following examples.

In this case, multiplexed HARQ-ACK information may be transmitted on the PUCCH resource determined for ACK/NACK-based feedback.

Embodiment 3-1

One bit for unicast HARQ-ACK and one bit for multicast HARQ-ACK may be multiplexed for PUCCH format 0 or 1, and SR may be dropped.

In this case, the MSB of the HARQ-ACK value of Table 6 may correspond to unicast HARQ-ACK, and the LSB of the HARQ-ACK value of Table 6 may correspond to the multicast HARQ-ACK. Alternatively, the MSB of the HARQ-ACK value of Table 6 may correspond to multicast HARQ-ACK, and the LSB of the HARQ-ACK value of Table 6 may correspond to the unicast HARQ-ACK.

Embodiment 3-2

It is assumed that one or two bits for unicast HARQ-ACK and one or two bits for multicast HARQ-ACK are multiplexed for PUCCH format 0 or 1, and SR is dropped.

In this case, except that the SR is dropped, the above-described embodiments 2-2-1, 2-2-2, 2-2-3, and 2-2-4 may be equivalently applied.

Embodiment 3-3

One or two bits for unicast HARQ-ACK and SR may be multiplexed for PUCCH format 0 or 1, and multicast HARQ-ACK may be dropped.

Embodiment 3-3-1

In the case of two bits for unicast HARQ-ACK, only one bit among them may be multiplexed with multicast HARQ-ACK and the other bit may be dropped.

In this case, the MSB of the HARQ-ACK value of Table 6 may correspond to unicast HARQ-ACK, and the LSB of the HARQ-ACK value of Table 6 may correspond to the SR. Alternatively, the MSB of the HARQ-ACK value of Table 6 may correspond to the SR, and the LSB of the HARQ-ACK value of Table 6 may correspond to the unicast HARQ-ACK.

Embodiment 3-3-2

In the case of two bits for unicast HARQ-ACK, when at least one bit of them corresponds to NACK, the multiplexed bit for unicast HARQ-ACK may be set to NACK.

When both bits for unicast HARQ-ACK correspond to ACK, the multiplexed bit for unicast HARQ-ACK may be set to ACK.

In this case, the MSB of the HARQ-ACK value of Table 6 may correspond to unicast HARQ-ACK, and the LSB of the HARQ-ACK value of Table 6 may correspond to the SR. Alternatively, the MSB of the HARQ-ACK value of Table 6 may correspond to the SR, and the LSB of the HARQ-ACK value of Table 6 may correspond to the unicast HARQ-ACK.

Embodiment 3-3-3

In the case of two bits for unicast HARQ-ACK, it is assumed that the SR is dropped and only the unicast HARQ-ACK bit is transmitted. In this case, both the MSB and the LSB of the HARQ-ACK value of Table 6 may correspond to the unicast HARQ-ACK.

Alternatively, it is assumed that the unicast HARQ-ACK bit is dropped and only the SR is transmitted. In this case, both the MSB and the LSB of the HARQ-ACK value of Table 6 may correspond to the SR.

Embodiment 3-4

One or two bits for multicast HARQ-ACK and SR may be multiplexed for PUCCH format 0 or 1, and unicast HARQ-ACK may be dropped.

Embodiment 3-4-1

In the case of two bits for multicast HARQ-ACK, only one bit among them may be multiplexed with SR and the other bit may be dropped.

In this case, the MSB of the HARQ-ACK value of Table 6 may correspond to multicast HARQ-ACK, and the LSB of the HARQ-ACK value of Table 6 may correspond to the SR. Alternatively, the MSB of the HARQ-ACK value of Table 6 may correspond to the SR, and the LSB of the HARQ-ACK value of Table 6 may correspond to the multicast HARQ-ACK.

Embodiment 3-4-2

In the case of two bits for multicast HARQ-ACK, when at least one bit of them corresponds to NACK, the multiplexed bit for multicast HARQ-ACK may be set to NACK.

When both bits for multicast HARQ-ACK correspond to ACK, the multiplexed bit for multicast HARQ-ACK may be set to ACK.

In this case, the MSB of the HARQ-ACK value of Table 6 may correspond to multicast HARQ-ACK, and the LSB of the HARQ-ACK value of Table 6 may correspond to the SR. Alternatively, the MSB of the HARQ-ACK value of Table 6 may correspond to the SR, and the LSB of the HARQ-ACK value of Table 6 may correspond to the multicast HARQ-ACK.

Embodiment 3-4-3

In the case of two bits for multicast HARQ-ACK, it is assumed that the SR is dropped and only the multicast HARQ-ACK bit is transmitted. In this case, both the MSB and the LSB of the HARQ-ACK value of Table 6 may correspond to the multicast HARQ-ACK.

Alternatively, it is assumed that the multicast HARQ-ACK bit is dropped and only the SR is transmitted. In this case, both the MSB and the LSB of the HARQ-ACK value of Table 6 may correspond to the SR.

Embodiment 4

The present embodiment relates to multiplexing of NACK only based HARQ-ACKs for multicast PDSCHs.

For a given G-RNTI, for transmission in the same PUCCH slot, when more than one NACK only-based feedback are available, the base station may define orthogonal PUCCH resources up to a predetermined number (e.g., A) and may select according to a combination of TBs up to a predetermined number (e.g., B) based on NACK only-based feedback.

For example, for up to B TBs based on NACK only based feedback, up to $2^B$ orthogonal PUCCH resources may be defined and may be select according to the combination of TBs up to B based on NACK only based feedback.

PUCCH resources for transmission may be determined by the last (or last received) multicast DCI. The last multicast DCI may correspond to a DCI/PDCCH whose reception in the terminal has recently been terminated in the time domain among DCI/PDCCHs for scheduling multicast PDSCHs to be subjected to HARQ-ACK multiplexing.

For more than B TBs based on NACK only based feedback, NACK only based feedback may be transformed into ACK/NACK based feedback. The ACK/NACK based feedback may include a method in which a terminal performs HARQ-ACK report when terminal-specific PUCCH resource(s) are provided to the terminal. Otherwise (i.e., when terminal-specific PUCCH resource is not provided), the terminal may not report the HARQ-ACK.

For example, for the same G-RNTI or for different G-RNTIs, it may be assumed that there are up to 4 TBs for NACK only based feedback, and there are 16 (or 15) PUCCH resources in one PUCCH resource set.

Table 7 shows an example of a list of PUCCH resources for multiplexing of NACK only based HARQ-ACKs. In the example of Table 7, N indicates NACK for the TB, and A indicates ACK for the TB. In addition, (A), (A-A), (A-A-A), (A-A-A-A) means all ACKs for the corresponding TB(s), so that HARQ-ACK is not transmitted (i.e., NACK-only based HARQ-ACK operation). In addition, in Table 7, the TB index (i.e., X in TB #X) and PUCCH resource index (i.e., Y in PUCCH resource ID #Y) are exemplary only, and it exemplarily indicates that the number of TBs and the combination of ACK or NACK for each TB may be mapped to a specific PUCCH resource index.

TABLE 7

| PUCCH resource set | TB#1 | TB#2-TB#3 | TB#2-TB#3-TB#4 | TB#4-TB#5-TB#6-TB#7 |
|---|---|---|---|---|
| PUCCH resource ID#1 | N | N-N | N-N-N | N-N-N-N |
| PUCCH resource ID#2 | (A) | A-N | A-N-N | A-N-N-N |
| PUCCH resource ID#3 | | N-A | N-A-N | N-A-N-N |
| PUCCH resource ID#4 | | (A-A) | A-A-N | A-A-N-N |
| PUCCH resource ID#5 | | | N-N-A | N-N-A-N |
| PUCCH resource ID#6 | | | A-N-A | A-N-A-N |
| PUCCH resource ID#7 | | | N-A-A | N-A-A-N |
| PUCCH resource ID#8 | | | (A-A-A) | A-A-A-N |
| PUCCH resource ID#9 | | | | N-N-N-A |
| PUCCH resource ID#10 | | | | A-N-N-A |
| PUCCH resource ID#11 | | | | N-A-N-A |
| PUCCH resource ID#12 | | | | A-A-N-A |
| PUCCH resource ID#13 | | | | N-N-A-A |
| PUCCH resource ID#14 | | | | A-N-A-A |
| PUCCH resource ID#15 | | | | N-A-A-A |
| PUCCH resource ID#16 | | | | (A-A-A-A) |

In the following examples, it may be assumed that the PUCCH resource selected for NACK only-based HARQ-ACK transmission for the same G-RNTI is a PUCCH resource (or PUCCH transmission) indicated by the PUCCH resource indicator (PRI) of the last received DCI for the G-RNTI.

Alternatively, the PUCCH resource may be selected based on PUCCH-config for unicast or PUCCH-config for ACK/NACK-based HARQ-ACK for multicast. For example, the PUCCH resource selected for NACK only-based HARQ-ACK transmission for the same G-RNTI may be selected based on PUCCH-config for ACK/NACK-based HARQ-ACK (i.e., for unicast or for multicast is not distinguished). When PUCCH-config for multicast is not provided, a PUCCH resource may be selected based on PUCCH-config for unicast.

It may be assumed that the PUCCH resource selected for NACK only based HARQ-ACK transmission for a plurality of G-RNTIs is a PUCCH resource (or PUCCH transmission) indicated by the PRI of the last received DCI for a plurality of G-RNTIs. Here, the plurality of G-RNTIs may be G-RNTIs to be received by the terminal, or G-RNTIs designated by the base station.

Embodiment 4-1

For transmission in a PUCCH slot, when only one NACK only based feedback for the multicast PDSCH is available, a terminal may determine a PUCCH resource based on the PRI of the multicast DCI scheduling the multicast PDSCH within the PUCCH resource set configured for one NACK only-based feedback.

For transmission in a PUCCH slot, when more than one NACK only-based feedback for multicast PDSCH are available, for the multiplexing of NACK-only-based feedbacks, a terminal may determine a PUCCH resource based on the PRI of the last multicast DCI as follows.

Option 1: For more than one NACK only-based feedback, the terminal may determine the PUCCH resource based on the PRI in the PUCCH resource set separately configured for multiplexing of the NACK only-based feedbacks.

Option 1A: The same PUCCH-config may include a PUCCH resource set configured for one NACK only based feedback, and a separate PUCCH resource set configured for multiplexing of NACK only based feedbacks. For example, in PUCCH-config, PUCCH resource set 0 may be configured to be associated with 1 bit of NACK only based HARQ-ACK, PUCCH resource set 1 may be configured to be related to multiplexing of multiple bits of NACK only based HARQ-ACK.

Option 1B: Different PUCCH-config configurations may include a PUCCH resource set configured for one NACK only based feedback, and a separate PUCCH resource set configured for multiplexing of NACK only based feedbacks, respectively.

Option 2: For more than one NACK only-based feedback, the terminal may determine the PUCCH resource based on the PRI of the PUCCH-config configured for the ACK/NACK-based feedback.

For example, in PUCCH-config configured for ACK/NACK-based feedback, PUCCH resource set 0 is configured to be associated with 1 bit of NACK only-based HARQ-ACK, PUCCH resource set 1 may be configured to be associated with multiplexing of multiple bits of NACK-only-based HARQ-ACK transformed into ACK/NACK-based HARQ-ACK.

Option 3: For more than one NACK only-based feedback, the terminal may determine a PUCCH resource in the same PUCCH resource set as the PUCCH resource set configured for one NACK only-based feedback.

For example, when 1-bit NACK only based HARQ-ACK is transmitted, the terminal may select the first PUCCH resource from the PUCCH resource set.

When more than one NACK-only-based HARQ-ACK are transmitted, the terminal may select the N-th PUCCH resource from the corresponding PUCCH resource set (e.g., PUCCH resource set in Table 7).

Option 3-1: All PUCCH resources of the PUCCH resource set may be configured for one or more NACK only-based HARQ-ACK. For example, when all PUCCH resources are capable of indicating 1-bit information, all PUCCH resources may be used in NACK only feedback mode. When all PUCCH resources are capable of indicating information of 2 bits or more, all PUCCH resources may be used for the ACK/NACK reporting mode transformation scheme. For example, in the case of 2 bits or more, the N-th PUCCH resource in the existing PUCCH resource set may be used after ACK/NACK transformation.

Option 3-2: In PUCCH resource set 0 of PUCCH-config, it may be assumed that a first group of PUCCH resource(s) is configured for one NACK only-based HARQ-ACK, and a second group of PUCCH resource(s) It is configured for more than one NACK-only-based HARQ-ACK.

For example, the first group may correspond to PUCCH resource indexes 1 to 16, which may be used for 1-bit NACK only-based HARQ-ACK. The second group may correspond to PUCCH resource indexes 17 to 32, which may be used for an ACK/NACK reporting mode transformation scheme for NACK only based HARQ-ACK of 2 bits or more. For example, in the case of 2 bits or more, the N-th PUCCH resource in the existing PUCCH resource set may be used after ACK/NACK transformation.

Embodiment 4-2

For transmission in a PUCCH slot, when only one NACK only based feedback for the multicast PDSCH is available, a terminal may determine a PUCCH resource based on the PRI of the multicast DCI scheduling the multicast PDSCH within the PUCCH resource set configured for one NACK only-based feedback.

For transmission in the same PUCCH slot, when more than one NACK only based feedback for multicast PDSCH are available, the terminal may determine HARQ-ACK as follows. For example, for the B NACK only based feedbacks in the same PUCCH slot, the terminal may multiplex the NACK only feedbacks based on the multicast DCI as follows.

As a first example, when the multicast DCI indicates a counter value being capable of indicating up to B, the terminal may multiplex up to B NACK-only based feedbacks, in response to the recently transmitted (or received) B multicast PDSCHs including the last multicast PDSCH scheduled by the corresponding multicast DCI.

As a second example, B may be equal to the maximum k1 value that may be indicated by the multicast DCI for NACK only based feedback. For example, the k1 value may correspond to an offset between the PDSCH reception slot and the HARQ-ACK transmission slot for the corresponding PDSCH. The terminal may drop the HARQ-ACK(s) for the multicast PDSCH(s) transmitted (or received) before the maximum k1 value for the PUCCH slot.

For transmission in the same PUCCH slot, it may be assumed that more than one NACK only based feedback for multicast SPS PDSCH are available. In this case, when all N group common PDSCHs are SPS PDSCHs, since there is no PRI indicated by DCI, the terminal may select a PUCCH resource of a specific group common PDSCH from among the SPS PDSCHs. Here, the specific group common PDSCH may be the group common PDSCH corresponding to the lowest SPS configuration index, the highest SPS configuration index, or high priority (HP), among the multicast SPSs configured with the ACK/NACK-based HARQ-ACK reporting mode.

Embodiment 5

The present embodiment relates to a method of constructing a type-1 HARQ-ACK codebook for multicast HARQ-ACK when receiving multicast from a plurality of serving cells.

Type-1 HARQ-ACK codebook may correspond to a HARQ-ACK codebook (i.e., a set of HARQ-ACK information bits) for reception of one or more candidate PDSCHs for which HARQ-ACK feedback information may be transmitted in PUCCH/PUSCH to be transmitted in a specific slot. Even when actual PDSCH transmission is not performed, bits for corresponding PDSCH reception may be defined in the HARQ-ACK codebook. When the terminal recognizes that there is no PDSCH transmission (including a case where PDCCH detection fails), it is defined to transmit a NACK. Meanwhile, in the case of the Type-2 HARQ-ACK codebook, a HARQ-ACK codebook may be constructed based on the C-DAI (counter downlink assignment indicator) and T-DAI (total downlink assignment indicator) values indicated in the actually transmitted PDCCH, that is, based on the PDCCH information actually transmitted to the terminal. That is, the type-1 HARQ-ACK codebook may correspond to a static scheme, and the type-2 HARQ-ACK codebook may correspond to a dynamic scheme.

Figure 10:
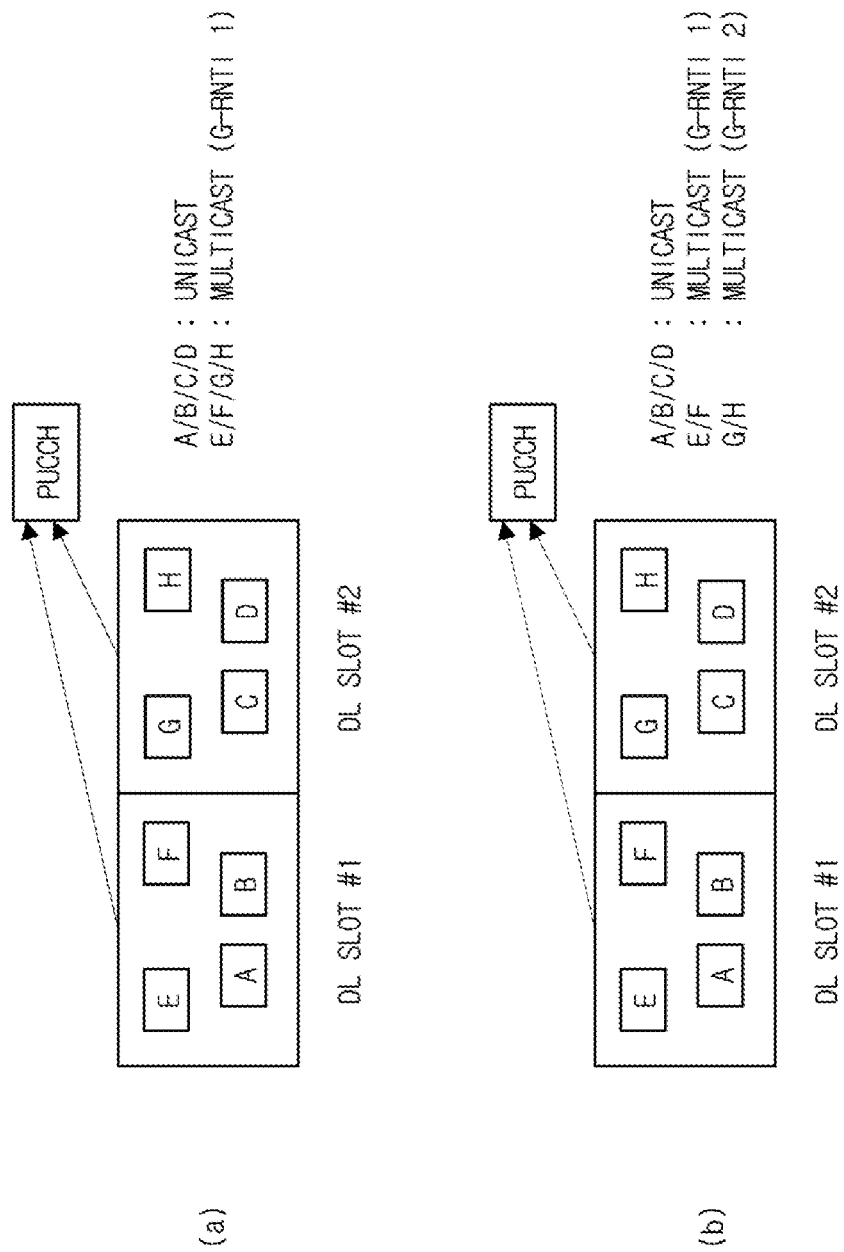
FIG. 10 is a diagram for illustrating examples of HARQ-ACK codebook construction for multiple cells according to the present disclosure.

FIG. 10 is a diagram for illustrating examples of HARQ-ACK codebook construction for multiple cells according to the present disclosure.

When unicast and multicast for the same priority from the same TRP are received in the FDM manner, HARQ-ACK bits for all PDSCH occasions over all slots for all serving cells for unicast may precede HARQ-ACK bits for all PDSCH occasions over all slots for all serving cells for multicast.

The terminal may report to the network the capability for the support of multiplexing of unicast and multicast in the FDM manner in the same slot. The terminal may be semi-statically configured/indicated to generate the type-1 HARQ-ACK codebook in the FDM manner. If there is no such configuration/indication, the terminal may not expect that unicast and multicast are scheduled in the FDM manner.

Embodiment 5-1

In the example (a) of FIG. 10, multicast transmissions and unicast transmissions for the same single G-RNTI are multiplexed and received in the same slot in the FDM manner. In constructing the type-1 codebook, the terminal may: generate sub-codebook #1 for unicast in all slots (associated with one PUCCH slot); generate sub-codebook #2 for multicast in all slots (associated with the same one PUCCH slot); append sub-codebook #2 to sub-codebook #1; and as a result, the joint codebook may be constructed in the order of HARQ-ACK information bits for A, B, C, D, E, F, G, and H.

Embodiment 5-2

In the example (b) of FIG. 10, multicast transmissions and unicast transmissions for a plurality of different G-RNTIs are multiplexed and received in the same slot in the FDM manner. In this case, the terminal may construct the codebook as follows.

Embodiment 5-2-1

When a plurality of G-RNTIs are configured for the terminal, and multicast reception in the FDM manner (e.g., fdmed-Reception-Multicast parameter) is configured, the HARQ-ACK sub-codebook for multicast is may be constructed as a sub-codebook for G-RNTIs.

The sub-codebook for all G-RNTIs may be generated per k1 value and time domain resource allocation (TDRA) configuration for the same G-RNTI.

For example, the terminal may construct the type-1 codebook for FDMed multicast transmissions for two G-RNTIs and unicast transmissions as follows: generate sub-codebook #1 for unicast in all slots (associated with one PUCCH slot); generate sub-codebook #2 for multicast for all G-RNTIs in all slots (associated with the same one PUCCH slot); append sub-codebook #2 to sub-codebook #1; and as a result, the joint codebook may be constructed in the order of HARQ-ACK information bits for A, B, C, D, E, F, G, and H.

Embodiment 5-2-2

When a plurality of G-RNTIs are configured for the terminal, and multicast reception in the FDM manner (e.g., fdmed-Reception-Multicast parameter) is configured, the HARQ-ACK sub-codebook for multicast may be constructed by appending sub-codebooks for each G-RNTI according to the ascending order (or descending order) of the G-RNTI values.

A sub-codebook for each G-RNTI may be generated per k1 value and TDRA configuration for the same G-RNTI.

The maximum number of G-RNTI (s) configured for the terminal for the FDMed unicast and multicast type-1 codebook may be determined according to the capability of the terminal.

For example, the terminal may construct the type-1 codebook for FDMed multicast transmissions for two G-RNTIs and unicast transmissions as follows: generate sub-codebook #1 for unicast in all slots (associated with one PUCCH slot); generate sub-codebook #2-1 for multicast for G-RNTI 1 in all slots (associated with the same one PUCCH slot); generate sub-codebook #2-2 for multicast for G-RNTI 2 in all slots (associated with the same one PUCCH slot); append sub-codebook #2-2 to sub-codebook #2-1 according to the ascending order of G-RNTI to generate sub-codebook #2; append sub-codebook #2 to sub-codebook #1; and as a result, the joint codebook may be constructed in the order of HARQ-ACK information bits for A, B, C, D, E, F, G, H, E, F, G, and H.

Here, among the HARQ-ACK information bits for A, B, C, D, E, F, G, H, E, F, G, H of the joint codebook, HARQ-ACK information bits for the first E, F, G, and H corresponding to sub-codebook #2-1 are for HARQ-ACK for E and F, and G and H correspond to bits defined in the HARQ-ACK codebook although no actual PDSCH transmission is performed. Similarly, HARQ-ACK information bits for the second E, F, G, and H corresponding to sub-codebook #2-2 are for HARQ-ACK for G and H, and E and F correspond to bits defined in the HARQ-ACK codebook although no actual PDSCH transmission is performed.

Embodiment 5-2-3

The terminal may determine the HARQ-ACK sub-codebook for multicast as in embodiment 5-2-2. Here, when the UCI transmitted through the PUCCH/PUSCH is not sufficient to accommodate the HARQ-ACK sub-codebook for multicast according to the embodiment 5-2-2, the terminal may determine the HARQ-ACK sub-codebook for multicast according to the embodiment 5-2-1.

Option 3A: When the UCI is not sufficient to accommodate the HARQ-ACK sub-codebook for multicast according to embodiment 5-2-2, the terminal may determine the HARQ-ACK sub-codebook for multicast according to embodiment 5-2-1. Otherwise (i.e., when UCI is sufficient), the UE may determine the HARQ-ACK sub-codebook for multicast according to embodiment 5-2-2.

Option 3B: When the number of G-RNTIs that the terminal is interested to receive is (equal to or greater than) greater than the threshold configured/indicated by the base station, the terminal may determine the HARQ-ACK sub-codebook for multicast according to embodiment 5-2-1. Otherwise (i.e., when the number of G-RNTIs that the terminal is interested to receive is (equal to or less than) less than the threshold), the terminal may determine the HARQ-ACK sub-codebook for multicast according to embodiment 5-2-2.

Option 3C: When the HARQ-ACK sub-codebook for multicast corresponds to the G-RNTI (s) for low priority (LP), the terminal may determine the HARQ-ACK sub-codebook for multicast according to embodiment 5-2-1. When the HARQ-ACK sub-codebook for multicast corresponds to the G-RNTI (s) for high priority (HP), the terminal may determine the HARQ-ACK sub-codebook for multicast according to embodiment 5-2-2.

Alternatively, when the HARQ-ACK sub-codebook for multicast corresponds to the G-RNTI (s) for high priority (HP), the terminal may determine the HARQ-ACK sub-codebook for multicast according to embodiment 5-2-1. When the HARQ-ACK sub-codebook for multicast corresponds to the G-RNTI (s) for low priority (LP), the terminal may determine the HARQ-ACK sub-codebook for multicast according to embodiment 5-2-2.

Option 3D: In the case of MTRP, when the HARQ-ACK sub-codebook for multicast corresponds to the first TRP, the terminal may determine the HARQ-ACK sub-codebook for multicast according to embodiment 5-2-1. When the HARQ-ACK sub-codebook for multicast corresponds to the second TRP, the terminal may determine the HARQ-ACK sub-codebook for multicast according to embodiment 5-2-2.

Here, the first TRP may be a TRP corresponding to the lowest (or highest) control resource set (CORESET) pool index, and the second TRP may be a TRP corresponding to another CORESET pool index. Alternatively, the second TRP may be a TRP corresponding to the lowest (or highest) CORESET pool index, and the first TRP may be a TRP corresponding to another CORESET pool index.

Option 3E: In the case of carrier aggregation (CA) or dual connectivity (DC), when the HARQ-ACK sub-codebook for multicast corresponds to the first serving cell (in the case of CA) or the first serving cell group (in the case of DC), the terminal may determine the HARQ-ACK sub-codebook for multicast according to embodiment 5-2-1. When the HARQ-ACK sub-codebook for multicast corresponds to the second serving cell (in the case of CA) or the second serving cell group (in the case of DC), the terminal may determine the HARQ-ACK sub-codebook for multicast according to embodiment 5-2-2.

Here, the first serving cell group may be a secondary cell group (SCG), and the second serving cell group may be a primary cell group or a master cell group (MCG). Alternatively, the first serving cell group may be a primary cell group or MCG, and the second serving cell group may be an SCG.

In addition, the first serving cell may be a secondary cell (SCell), and the second serving cell may be an SpCell. Alternatively, the first serving cell may be an SpCell and the second serving cell may be an SCell. SpCell may correspond to a primary cell (PCell) in MCG and may correspond to a primary secondary cell (PSCell) in SCG.

Alternatively, the first serving cell may be a scheduling cell, and the second serving cell may be a scheduled cell. Alternatively, the first serving cell may be a scheduled cell, and the second serving cell may be a scheduling cell.

Figure 11:
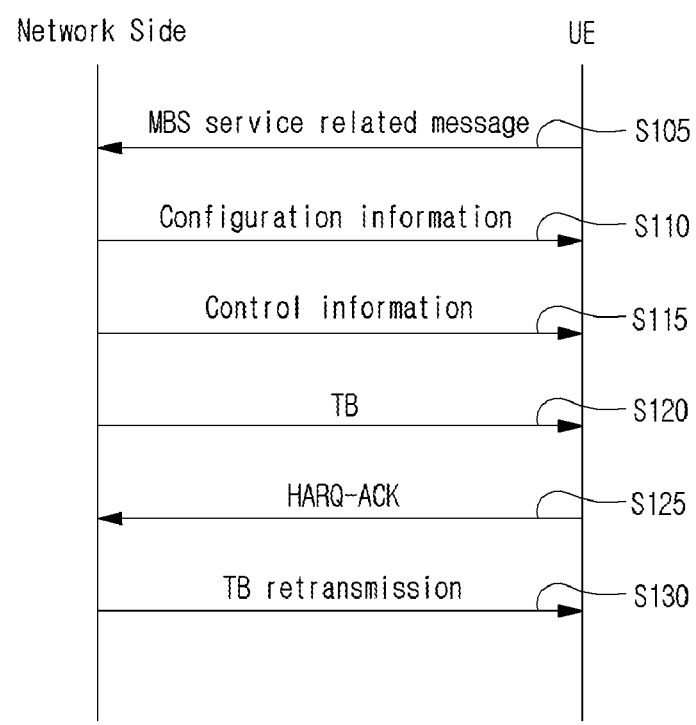
FIG. 11 is a diagram for illustrating a signaling process of a network side and a terminal according to an embodiment of the present disclosure.

FIG. 11 is a diagram for illustrating a signaling procedure of the network side and the terminal according to an embodiment of the present disclosure.

FIG. 11 shows an example of signaling between a network side and a terminal (UE) in a situation to which the examples (e.g., embodiments 1, 2, 3, 4, 5, or its detailed examples, and a combination of one or more thereof) of the present disclosure described above may be applied.

Figure 12:
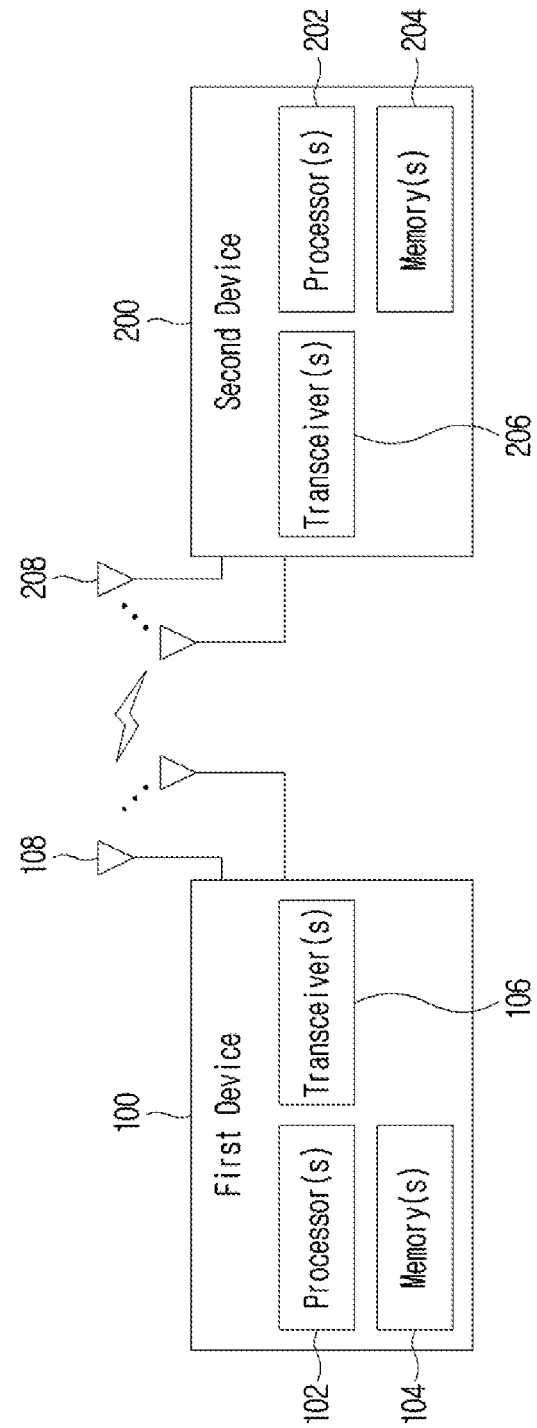
FIG. 12 is a diagram which illustrates a block diagram of a wireless communication device according to an embodiment of the present disclosure.

Here, the UE/network side is exemplary, and may be replaced with various devices to be described with reference to FIG. 12. FIG. 11 is for convenience of description, and does not limit the scope of the present disclosure. Also, some step(s) shown in FIG. 11 may be omitted depending on circumstances and/or settings. In addition, in the operation of the network side/UE of FIG. 11, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may enter the RRC_CONNECTED mode, and may report a message indicating one or more interested MBS services to the network side (S105).

Here, the UE may transmit the message to the network side through at least one of UCI, MAC CE (Control Element), or RRC message. In addition, the MBS service of interest in the message may mean one of TMGI and G-RNTI listed in a DL message received from the network side.

For example, the DL message may be a service availability message listing TMGI #1, TMGI #3, TMGI #5, and TMGI #10. When the UE is interested in TMGI #5, the UE may indicate the order of TMGI #5 in the message. That is, the terminal may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

For example, the operation of the UE (100 or 200 in FIG. 12) of the above-described step S105 transmitting the message to the network side (200 or 100 in FIG. 12) may be implemented by the device of FIG. 12 to be described below. For example, referring to FIG. 12, the one or more processors 102 may control one or more transceivers 106 and/or one or more memories 104, etc. to transmit the message, and the one or more transceivers 106 may transmit the message to the network side.

Upon receiving the message, the network side may transmit configuration information to the UE by an RRC message (S110).

For example, the configuration information may include CFR (common frequency resource) configuration information, one or more group common PDSCH configuration information including TCI states for one or more G-RNTI values, search space configuration information including TCI states for one or more G-RNTI values.

Here, the RRC message may be a group common message transmitted through a PTM MCCH (Multicast Control Channel) or a UE-dedicated message transmitted through a UE-specific DCCH (Dedicated Control Channel).

In addition, CFR may include DL CFR and UL CFR. For example, one DL CFR may provide group common PDCCH and group common PDSCH transmission resources for MBS transmission or reception. One UL CFR may provide HARQ-ACK PUCCH resources for group common PDSCH reception. One CFR may be one MBS-specific BWP or one UE-specific BWP. Additionally or alternatively, one or a plurality of CFRs may be configured in one UE-specific BWP. One CFR may have a linkage relationship with one UE-specific BWP.

The terminal may be configured with at least a G-RNTI value for each MBS CFR or each serving cell. GC-CS-RNTI may be configured/used for activation, retransmission or release of one or more group common SPS configurations.

When the UE is not configured with GC-CS-RNTI for CFR or serving cell, and CS-RNTI is configured for CFR or serving cell, the UE may use CS-RNTI for activating, retransmitting, or releasing of one or more group common SPS configurations.

The network side may associate one GC-CS-RNTI value with a TMGI list or a G-RNTI list. In this case, the network side may provide a TMGI list or a G-RNTI list associated with the GC-CS-RNTI value.

In addition, configuration information of each PDSCH (e.g., 'PDSCH-config') may be configured as shown in Table 8 as a minimum information element for multicast and/or broadcast.

For example, the operation of the UE (100 or 200 in FIG. 12) of the above-described step S110 receiving configuration information from the network side (200 or 100 in FIG. 12) may be implemented by the device of FIG. 12 to be described below. For example, referring to FIG. 12, the one or more processors 102 may control one or more transceivers 106 and/or one or more memories 104, etc. to receive the configuration information, and the one or more transceivers 106 may receive the configuration information from the network side.

The UE may receive control information from the network side (S115). For example, the UE may receive downlink control information (DCI) for scheduling/activating/releasing uplink/downlink transmission from the network side.

Specifically, when the search space is configured for the configured CFR, the UE may monitor the PDCCH in the SS (search space) configured in the configured CFR, to receive DCI CRC scrambled with G-RNTI or G (group)-CS (configured scheduling)-RNTI.

For example, the operation of the UE (100 or 200 in FIG. 12) of the above-described step S115 receiving control information from the network side (200 or 100 in FIG. 12) may be implemented by the device of FIG. 12 to be described below. For example, referring to FIG. 12, the one or more processors 102 may control one or more transceivers 106 and/or one or more memories 104, etc. to receive the control information, and the one or more transceivers 106 may receive the control information from the network side.

The UE may receive the TB from the network side (S120).

Specifically, when the data unit is available on the MTCH of the MBS radio bearer (MRB) for the MBS service, the network side may construct and transmit a TB including the data unit for an SPS PDSCH occasion associated with the MTCH of the MRB for the MBS service, or associated with TMGI of the MBS service, or associated with a short ID of the MBS service, or associated with G-RNTI mapped to the MBS service, according to the service-to-resource mapping.

For group common dynamic scheduling of the TB, the network side may transmit DCI through PDCCH to the UE. The corresponding DCI may be CRC scrambled by

TABLE 8

```
PDSCH-Config ::= SEQUENCE {
dataScramblingIdentityPDSCH INTEGER (0..1023) OPTIONAL, -- Need S
dmrs-DownlinkForPDSCH-MappingTypeA   SetupRelease  {  DMRS-
DownlinkConfig } OPTIONAL, -- Need M
dmrs-DownlinkForPDSCH-MappingTypeB   SetupRelease  {  DMRS-
DownlinkConfig } OPTIONAL, -- Need M
tci-StatesToAddModList SEQUENCE (SIZE(1..maxNrofTCI-States)) OF TCI-
State OPTIONAL, -- Need N
tci-StatesToReleaseList SEQUENCE (SIZE(1..maxNrofTCI-States)) OF TCI-
StateId OPTIONAL, -- Need N
vrb-ToPRB-Interleaver ENUMERATED {n2, n4} OPTIONAL, -- Need S
resourceAllocation   ENUMERATED   {   resourceAllocationType0,
resourceAllocationType1, dynamicSwitch},
pdsch-TimeDomainAllocationList  SetupRelease  {  PDSCH-
TimeDomainResourceAllocationList } OPTIONAL, -- Need M
pdsch-AggregationFactor ENUMERATED { n2, n4, n8 } OPTIONAL, -- Need S
rateMatchPatternToAddModList SEQUENCE (SIZE
(1..maxNrofRateMatchPatterns)) OF RateMatchPattern OPTIONAL, -- Need N
rateMatchPatternToReleaseList SEQUENCE (SIZE
(1..maxNrofRateMatchPatterns)) OF RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
... }
```

G-RNTI, G-CS-RNTI, or CS-RNTI. The PDCCH may be implemented as a group common PDCCH or a UE-specific PDCCH.

For example, the DCI may include at least one of an identifier for the DCI format, a carrier indicator, a bandwidth part indicator, frequency domain resource assignment, time domain resource assignment, VRB-to-PRB mapping, PRB bundling size indicator, rate matching indicator, ZP CSI-RS trigger, MCS, NDI, RV, HARQ process number, downlink assignment index, TPC command for scheduled PUCCH, PUCCH resource indicator, PDSCH-to-HARQ_feedback timing indicator, an antenna port, a transmission configuration indication, an SRS request, a DMRS sequence initialization, or a priority indicator.

For group common dynamic scheduling, by group common or UE-specific RRC message or by group common or UE-specific MAC CE, the network side may provide with UE one or more of the service-resource mappings for the MBS service identified by TMGI or G-RNTI or GC-CS-RNTI. Data of the MBS service may be carried through MBS radio bearer (MRB) of a multicast traffic logical channel, that is, MTCH associated to the MBS service. RRC message may be a group common message transmitted through PTM MCCH (Multicast Control Channel) or UE-dedicated message transmitted through UE-specific DCCH (Dedicated Control Channel). The DCI scheduling PDSCH carrying the MBS service data may additionally indicate at least one of short ID, MTCH ID, MRB ID, G-RNTI value, and a TMGI value for the MBS service.

When receiving DCI CRC scrambled by G-RNTI that the UE is interested to receive, the UE may determine MBS service(s) associated with one or more of short ID, MTCH ID, MRB ID, G-RNTI value, and a TMGI value for each PDSCH occasion, based on mapping between MBS service and HPN indicated in the DCI, and/or mapping between MBS service and short ID(s) indicated in the DCI.

Then, when UE is interested in the determined MBS service(s), the UE may receive PDSCH transmission scheduled by the DCI. When the UE is not interested in the determined MBS service(s), UE may not receive PDSCH transmission scheduled by the DCI.

For example, the operation of the UE (100 or 200 in FIG. 12) of the above-described step S120 receiving the TB from the network side (200 or 100 in FIG. 12) may be implemented by the device of FIG. 12 to be described below. For example, referring to FIG. 12, the one or more processors 102 may control one or more transceivers 106 and/or one or more memories 104, etc. to receive the TB, and the one or more transceivers 106 may receive the TB from the network side.

Upon receiving group common DCI indicating PUCCH resource(s) for MBS HARQ-ACK, the UE may transmit HARQ-ACK through PUCCH after a PDSCH reception scheduled by the DCI (S125). That is, according to decoding status of PDSCH transmission, the UE may transmit HARQ feedback to the network side.

In the case of PTM scheme 1, group common DCI may indicate a single PUCCH resource indicator and a single PDSCH-to-HARQ_feedback timing indicator at least for ACK/NACK based HARQ-ACK.

Specifically, in the case of UE-specific PUCCH resource allocation for ACK/NACK based HARQ-ACK for group common DCI, different UEs in the corresponding group (unless 'PUCCH-config' for multicast is configured) may be configured with different values of at least 'PUCCH-Resource' and 'dl-DataToUL-ACK' in UE-dedicated 'PUCCH-config' for multicast or for unicast. Different UEs may be allocated with different PUCCH resources, by the same PUCCH resource indicator and the same 'PDSCH-to-HARQ_feedback timing indicator of the group common DCI.

In the case of PTP retransmission, the PUCCH resource indicator and the PDSCH-to-HARQ_feedback timing indicator in the UE-specific DCI may be interpreted based on 'PUCCH-config' for unicast, regardless of whether 'PUCCH-config' for multicast is configured or not.

Here, PRI (PUCCH Resource Indicator) may be indicated by group common DCI as follows.

As an example, UE-specific PRI list may be included in the DCI (option 1A-1). Each PRI in the corresponding list may indicate an entry corresponding to a candidate 'pucch-ResourceId' value of 'PUCCH-config' for allocation of the same PUCCH resource or different PUCCH resources for different UEs in the group receiving the same DCI. Different PRI of DCI may indicate different entry in 'PUCCH-config.'

Here, a candidate 'pucch-ResourceId; value may be configured by RRC, and a different 'pucch-ResourceId' value may be configured for a different UE in the same group at least in multicast PUCCH-config.

As an additional example, a group common PRI may be included in the DCI (option 1-A-2). A single group common PRI may indicate a specific entry for a candidate 'pucch-ResourceId' value in UE-specific 'PUCCH-config' for allocation of the same or different PUCCH resources for all UEs in the group.

In addition, a candidate 'pucch-ResourceId' value may be configured by RRC. Different 'pucch-ResourceId' value may be configured for different UE in the same group at least in 'PUCCH-config' for multicast.

When 'PUCCH-config' for multicast is configured for HARQ-ACK for group common PDSCH scheduled by the group common DCI, the UE may assume that the PRI of the group common DCI indicates an entry corresponding to a candidate 'pucch-ResourceId' value in 'PUCCH-config' for multicast.

When 'PUCCH-config' for multicast is not configured for HARQ-ACK for group common PDSCH scheduled by the group common DCI, the UE may assume that the PRI of the group common DCI indicates an entry corresponding to a candidate 'pucch-ResourceId' value in 'PUCCH-config' for unicast.

K1 (PDSCH-to-HARQ_feedback timing indicator) may be indicated by group common DCI as follows.

As an example, UE-specific K1 value list may be included in the DCI (option 1B-1). Each K1 in the list may indicate the same UL slot or different UL (sub-)slot for different UE in the group.

For example, Different K1 values may be allocated to different UEs. That is, K1 may be allocated to UE1, K2 may be allocated to UE2, K3 may be allocated to UE3.

As an additional example, multiple UEs may share K1 value. For example, UE1 and UE2 may share K1 value, UE3 and UE4 may share K2 value.

As an additional example, one K1 value may be a reference, and other K1 value may be allocated based on the reference. {K1 ref, K1_offset list} may be indicated by DCI.

For example, UE1 may use K1_ref, UE2 may use K1_ref+K1_offset1, UE3 may use K1_ref+K1_offset2.

As an additional example, group common K1 value may be included in the DCI (option 1B-2). For example, a single K1 value may indicate an entry corresponding to a candidate 'dl-DataToUL-ACK' values in UE-specific 'PUCCH-config' for allocation of the same or different PUCCH resources for all UEs in the group receiving the DCI. This may be applied for the case that a DCI format is configured in UE-specific 'PUCCH-config' for the K1 value.

As an additional example, a candidate 'dl-DataToUL-ACK' value may be configured by RRC, and may be differently configured for different UE in the same group at least in 'PUCCH-config' for multicast.

As an additional example, when 'PUCCH-config' for multicast is configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for multicast.

As an additional example, when 'PUCCH-config' for multicast is not configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for unicast.

In addition, when the UE receives group common DCI CRC scrambled by G-RNTI and/or UE-specific DCI CRC scrambled by C-RNTI, and when Type-1 HARQ-ACK codebook is configured for 'PUCCH-config' for multicast and/or 'PUCCH-config' for unicast, UE may construct TDRA (Time Domain Resource Allocation) to generate Type-1 HARQ-ACK codebook for HARQ-ACK(s) for group common PDSCH scheduled by group common DCI and/or UE-specific PDSCH scheduled by UE-specific DCI.

When TB decoding in a PDSCH transmission occasion is not successful, UE may transmit HARQ NACK to the network side through a PUCCH resource in the configured UL CFR.

Using PUCCH resource, the UE may transmit HARQ-ACK for other PDSCH transmissions such as unicast SPS PDSCH, dynamic unicast PDSCH, PTP retransmission and/or dynamic group common PDSCH.

Here, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, UE may construct a codebook based on one or more of the above options.

When RSRP threshold is configured, the UE may use NACK only based HARQ-ACK based on the measured RSRP of a serving cell. When the measured RSRP is higher than a threshold, NACK only based HARQ-ACK may be transmitted through group common PUCCH resource indicated by PRI of DCI. When the measured RSRP is lower than the threshold, NACK only based HARQ-ACK may be transformed into ACK/NACK based HARQ-ACK on UE-specific PUCCH resource indicated by PRI of DCI.

Meanwhile, when the 'pdsch-AggregationFactor' is configured for a G-RNTI or when 'repetition_number' is indicated by the network side by DCI, the TB scheduled by group common DCI may be repeated for Nth HARQ transmission of the TB within each symbol allocation among each of the 'pdsch-AggregationFactor' consecutive slots or among each of the 'repetition_number' consecutive slots, if configured.

For example, the operation of the UE (100 or 200 in FIG. 12) of the above-described step S125 transmitting the HARQ-ACK to the network side (200 or 100 in FIG. 12) may be implemented by the device of FIG. 12 to be described below. For example, referring to FIG. 12, the one or more processors 102 may control one or more transceivers 106 and/or one or more memories 104, etc. to transmit the HARQ-ACK, and the one or more transceivers 106 may transmit the HARQ-ACK to the network side.

Receiving HARQ NACK of a TCI state, the network side may retransmit, using the TCI state, PDCCH and PDSCH in the DL CFR configured for retransmission of TB (S130).

UE may monitor group common and/or UE-specific PDCCH using the TCI state for a search space configured in DL CFR to receive a retransmission of the TB. The network side may retransmit the TB to one of the UEs in the group by UE-specific PDCCH. Meanwhile, other UE(s) may not receive the retransmission of the TB, as it has successfully received the TB.

When the UE receives the PDCCH for the retransmission of the TB, the UE may receive the PDSCH scheduled by the DCI of the PDCCH. When the UE successfully decodes the TB in the PDSCH, the UE may consider that the decoded TB is associated with MTCH, MRB, TMGI, G-RNTI and/or short ID of MBS service, based on mapping between MBS service and HPN (HARQ Process Number) indicated by the DCI, and/or mapping between MBS service and short ID(s) indicated by the DCI.

When TB decoding in PDSCH transmission occasion is successful, the UE may transmit HARQ ACK to the network side through PUCCH resource in UL CFR configured according to the above-described procedure. Using PUCCH resource, the UE may transmit HARQ-ACK for other PDSCH transmission such as unicast SPS PDSCH, dynamic unicast PDSCH, PTP retransmission and/or dynamic group common PDSCH.

In this case, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, the UE may construct a codebook based on one or more of the above-described options/embodiments.

For example, the operation of the UE (100 or 200 in FIG. 12) of the above-described step S130 receiving TB retransmission from the network side (200 or 100 in FIG. 12) may be implemented by the device of FIG. 12 to be described below. For example, referring to FIG. 12, the one or more processors 102 may control one or more transceivers 106 and/or one or more memories 104, etc. to receive TB retransmission, and the one or more transceivers 106 may receive TB retransmission from the network side.

General Device to which the Present Disclosure May be Applied

FIG. 17 illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206.

One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
receiving, by a terminal from a network, at least one physical downlink shared channel (PDSCH); and
transmitting, by the terminal to the network, hybrid automatic repeat request-acknowledgement (HARQ-ACK) information,
wherein, for the HARQ-ACK information associated only with a second HARQ-ACK reporting mode and for more than one HARQ-ACK information bit;
a physical uplink control channel (PUCCH) resource is determined from a first PUCCH configuration information for multicast related to a first HARQ-ACK reporting mode, based on the first PUCCH configuration information being provided,
the second HARQ-ACK reporting mode corresponds to a reporting mode that HARQ-ACK information including only ACK values is not transmitted and HARQ-ACK information including a non-acknowledgement (NACK) value is transmitted, and
the first HARQ-ACK reporting mode corresponds to a reporting mode that an ACK value or a NACK value based on whether a transport block of the at least one PDSCH being successfully decoded or not is generated.

2. The method of claim 1, wherein:
the PUCCH resource is determined from a second PUCCH configuration information for unicast, based on the first PUCCH configuration information for the multicast not being provided.

3. The method of claim 1, wherein:
for the HARQ-ACK information associated only with the second HARQ-ACK reporting mode and for the more than one HARQ-ACK information bit, HARQ-ACK information is provided according to the first HARQ-ACK reporting mode.

4. A terminal comprising:
at least one transceiver; and
at least one processor connected to the at least one transceiver,
wherein the at least one processor is configured to:
receive, from a network through the at least one transceiver, at least one physical downlink shared channel (PDSCH); and
transmit, to the network through the at least one transceiver, hybrid automatic repeat request-acknowledgement (HARQ-ACK) information,
wherein, for the HARQ-ACK information associated only with a second HARQ-ACK reporting mode and for more than one HARQ-ACK information bit;
a physical uplink control channel (PUCCH) resource is determined from a first PUCCH configuration information for multicast related to a first HARQ-ACK reporting mode, based on the first PUCCH configuration information being provided,
the second HARQ-ACK reporting mode corresponds to a reporting mode that HARQ-ACK information including only ACK values is not transmitted and HARQ-ACK information including a non-acknowledgement (NACK) value is transmitted, and
the first HARQ-ACK reporting mode corresponds to a reporting mode that an ACK value or a NACK value based on whether a transport block of the at least one PDSCH being successfully decoded or not is generated.

5. A base station comprising:
at least one transceiver; and
at least one processor connected to the at least one transceiver,
wherein the at least one processor is configured to:
transmit, to a terminal through the at least one transceiver, at least one physical downlink shared channel (PDSCH); and
receive, from the terminal through the at least one transceiver, hybrid automatic repeat request-acknowledgement (HARQ-ACK) information,
wherein, for the HARQ-ACK information associated only with a second HARQ-ACK reporting mode and for more than one HARQ-ACK information bit:
a physical uplink control channel (PUCCH) resource is determined from a first PUCCH configuration information for multicast related to a first HARQ-ACK reporting mode, based on the first PUCCH configuration information being provided,
the second HARQ-ACK reporting mode corresponds to a reporting mode that HARQ-ACK information including only ACK values is not transmitted and HARQ-ACK information including a non-acknowledgement (NACK) value is transmitted, and
the first HARQ-ACK reporting mode corresponds to a reporting mode that an ACK value or a NACK value based on whether a transport block of the at least one PDSCH being successfully decoded or not is generated.

* * * * *